United States Patent
Gerstner et al.

(10) Patent No.: US 6,715,580 B1
(45) Date of Patent: Apr. 6, 2004

(54) GAS FLOW-THROUGH LINE WITH SOUND ABSORPTION EFFECT

(75) Inventors: Ralph Gerstner, Hannover (DE); Hans Kutter-Schrader, Isernhagen (DE)

(73) Assignee: Stankiewicz GmbH, Adelhidsdorf (DE)

( * ) Notice: Subject to any disclaimer, the term of this patent is extended or adjusted under 35 U.S.C. 154(b) by 0 days.

(21) Appl. No.: 09/554,301

(22) PCT Filed: Nov. 12, 1998

(86) PCT No.: PCT/EP98/07245
§ 371 (c)(1),
(2), (4) Date: Aug. 11, 2000

(87) PCT Pub. No.: WO99/24708
PCT Pub. Date: May 20, 1999

(30) Foreign Application Priority Data

Nov. 12, 1997 (DE) .......................................... 197 50 102

(51) Int. Cl.⁷ .............................................. E04F 17/04
(52) U.S. Cl. .................. 181/224; 181/229; 181/249
(58) Field of Search ................................ 181/203, 204, 181/224, 229, 249, 250, 251, 255, 269, 272, 282, 403; 417/312

(56) References Cited

U.S. PATENT DOCUMENTS

| | | | |
|---|---|---|---|
| 3,974,649 A | * 8/1976 | Camboulives et al. ...... 181/204 |
| 4,787,473 A | 11/1988 | Fuchs et al. | |
| 5,238,370 A | * 8/1993 | DiFlora ...................... 181/403 |
| 5,700,527 A | 12/1997 | Fuchs et al. | |
| 5,740,649 A | 4/1998 | Fuchs et al. | |
| 5,750,944 A | 5/1998 | Fuchs | |
| 5,975,238 A | 11/1999 | Fuchs et al. | |
| 5,979,598 A | 11/1999 | Wolf et al. | |
| 6,155,067 A | * 12/2000 | Ono et al. ................. 181/403 |

FOREIGN PATENT DOCUMENTS

| | | |
|---|---|---|
| DE | 33 35 210 A1 | 4/1985 |
| DE | 35 04 208 A1 | 8/1986 |
| DE | 37 07 650 C1 | 6/1988 |
| DE | 38 07 128 A1 | 9/1989 |
| DE | 38 30 759 A1 | 3/1990 |
| DE | 90 15 414.2 | 3/1991 |
| DE | 40 27 511 C1 | 10/1991 |
| DE | 91 16 233.5 | 7/1992 |
| DE | 43 15 759 C1 | 5/1994 |
| DE | 43 12 885 A1 | 10/1994 |
| DE | 195 00 450 A1 | 7/1995 |
| DE | 44 08 782 A1 | 9/1995 |
| DE | 44 19 219 A1 | 3/1996 |
| DE | 44 33 103 A1 | 3/1996 |
| DE | 44 37 196 C1 | 3/1996 |
| DE | 195 04 223 A1 | 8/1996 |
| DE | 195 06 511 A1 | 8/1996 |
| DE | 195 06 512 A1 | 9/1996 |
| DE | 296 11 271 U1 | 12/1996 |
| DE | 195 37 269 A1 | 4/1997 |
| DE | 196 15 917 A1 | 10/1997 |
| EP | 0 360 044 A1 | 3/1990 |
| EP | 0 498 261 A2 | 8/1992 |
| FR | 2743848 | 7/1997 |
| WO | WO 86/04668 | 8/1986 |
| WO | WO 95/25325 | 9/1995 |
| WO | WO 96/26331 | 8/1996 |
| WO | WO 97/09527 | 3/1997 |

OTHER PUBLICATIONS

International Search Report in PCT/EP98/07245 dated Mar. 29, 1999.
International Preliminary Examination Report in PCT/EP98/07245 dated Feb. 9, 2000.

* cited by examiner

*Primary Examiner*—Khanh Dang
(74) *Attorney, Agent, or Firm*—Marshall, Gerstein & Borun (57) ABSTRACT

The present invention relates to a gas flow-through line with a sound absorption effect. Thereby the wall (5) of the line (1) has through-going perforations (2) having a diameter of less than 1 mm. The invention can for example find employment in the air suction hoses of a turbocharger of an internal combustion engine.

25 Claims, 6 Drawing Sheets

GAS FLOW-THROUGH LINE WITH SOUND ABSORPTION EFFECT

FIELD OF THE INVENTION

The present invention relates to a gas flow-through line with sound absorption effect. The invention relates in particular to air flow-through pipelines with sound absorption effect.

BACKGROUND OF THE INVENTION

As a possibility for sound absorption there are known so-called Helmholz absorbers, which however in dependence upon their geometric configuration, exhibit a good absorption effect only for narrowly restricted frequency ranges. Further, Helmholz absorbers usually have relatively large dimensions, which strongly restricts their field of application.

Further, there are known sound absorption devices of fibrous and porous materials, which however manifest a number of disadvantages. On the one hand, the frequently heterogeneous mixture of materials of these systems is recycling unfriendly. Furthermore, particles can detach themselves out of these materials, so that the systems are not suitable for lines carrying air. Moreover, the porous materials suffer from the fact that they manifest a strong take-up of water.

As a further possibility for sound absorption there are known so-called microperforated sheet absorbers, arranged in front of a rigid, i.e. reverberant, wall. The physical background of this kind of sound absorber is described in IBP-Mitteilung 261-21 (1994), "Neue Forschungsergebnisse—kurzgefaßt", of the Fraunhofer Institute for Structural Physics. The absorption effect with these absorbers is based in substance upon the viscous friction, which for example through-flowing air in the holes of the microperforation has to overcome.

From DE 4315759 C1 there is known a sound absorbing glass or transparent plastics component which has through-holes with a very small diameter in the range from 0.2 to 2 mm and which is mounted with a spacing in front of a rigid back wall. The sound absorbing component is provided in the manner of the plate with various shapings, such as for example concave or convex with reference to the back wall, or also in the shape of a roof. The advantage of these elements consists inter alia in that they are transparent and can also be employed in rooms subject to damp or moisture. Further, they can themselves represent design elements for a variety of rooms.

The microperforated absorbers known from the state of the art have the disadvantage that they must be employed as relatively large area plates at a spacing from a rigid back wall and thus are not suitable to follow complicated contours. Furthermore, the space requirement of the overall arrangement is increased.

It is thus the object of the present invention to provide a sound absorption arrangement which has a lesser requirement for space.

SUMMARY OF THE INVENTION

In accordance with the present invention there is thus provided a gas flow-through line with a sound absorption effect, whereby the wall of the line contains through-going microperforations. As microperforations there are to be understood holes with a diameter of less than 1–2 mm.

The line may in particular be a pipeline carrying a flow of air, having a substantially circular cross-section.

The free hole surface of the microperforations takes up preferably a maximum of 10 per cent of the total surface of the wall of the line.

Preferably, the microperforations have approximately circular through-going holes having a diameter of the order of 0.40 to 0.50 mm, in particular about 0.45 mm.

The microperforations may have any arbitrary geometry, and may also be slit-shaped.

The line may have second holes, the free diameter of which is substantially larger than that of the microperforations, but smaller than about 5 mm.

The line may be of a polymer plastics, rubber or rubber-like materials, or of natural products.

A line of the above-mentioned kind can find employment in particular as air suction hose of an internal combustion engine.

The line may also be employed as an air suction hose of a turbocharger of an internal combustion engine.

The line of the above mentioned kind can be employed for sound absorption of frequencies of more than 1,000 Hz.

A line having the second holes can be employed in particular for sound absorption of frequencies of more than 500 Hz. There may be provided also perforations which differ from section to section.

By means of an acoustically optimised sheathing of the line having the microperforations, at least in sections, the frequency band over which airborne noise is absorbed can be significantly widened. This sheathing may be effected in coffer-like sections.

Through forming the wall of the line by means of at least two perforated wall layer parts, which are displaceable with respect to one another, the effective opening surface of the perforations can be configured to be settable.

The present invention relates further to a method for the manufacture of the line of the above mentioned kind, whereby the method comprises the step of manufacturing the microperforations by means of stamping (and thus mechanically) and/or by means of working with a laser beam.

BRIEF DESCRIPTION OF THE DRAWING

The invention will now be described in more detail with reference to exemplary embodiments and with reference to the accompanying drawings. There is shown:

FIGS. 6(A,B) a pipe-shaped configuration of a line in accordance would be present invention, having a sheathing, FIGS. 7(A,B) a further development of the configuration in accordance with the FIGS. 6(A,B), having a sheathing divided into coffer-like sections, FIGS. 8(A,B) a further development of the configuration in accordance with FIG. 7, having different hole surface extents, FIG. 9 a graphical illustration of the articulation index in the case of an area absorber having microperforations, provided only over a partial surface, FIG. 10 schematically in partial section and perspective, an arrangement of a wall of a line with contour-following sheathing and differently formed perforations, the wall developing, in comparison with a pipeline, arbitrarily, FIG. 11 schematically, an arrangement in which a wall is formed by means of wall layer parts.

DETAILED DESCRIPTION OF THE PREFERRED EMBODIMENTS

Figure 1:
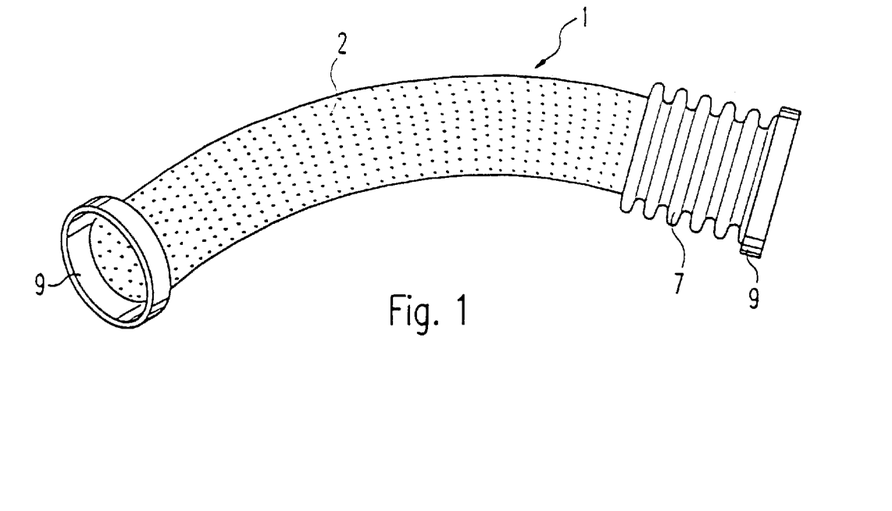
FIG. 1 an overall view of the gas flow-through line with sound absorption effect, in accordance with the invention.

In FIG. 1 there is illustrated, as first exemplary embodiment of the invention, the application of the present invention to an air suction hose 1 of an internal combustion motor (not shown). This pipe-shaped absorber can be employed for example in the region of sensitive engine parts, such as for example the suction hose of a turbocharger. Turbochargers emit very high frequency noise, having frequencies of more than 1 kHz, and are moreover mechanically so sensitive that particles possibly released in the path of the air suction can lead to serious mechanical damage. The present invention can also be employed with a other air channels, for example cooling air channels in the engine compartment of a vehicle, with which frequencies of less than 1 kHz largely determine the emitted noise level. In general, with these applications, only little space is available for sound damping or sound absorbing devices.

As can be seen, the microperforations 2, which bring about the sound absorption, are provided in the wall of the air flow-though line 1. In comparison with a conventional line, without sound absorption effect, there are thus no additional devices necessary, so that the space requirement, for example due to additional lengths or greater diameters, does not increase, in contrast to the known sound absorption devices.

As is shown in FIG. 1, the suction hose (pipeline) 1 has microperforations 2, which penetrate through the wall 4 of the suction hose 1. By microperforations there are to be understood holes having a diameter of less than 1 to 2 mm. By means of the provision of the microperforations 2, there can be attained an airborne sound absorption degree→ of up to 1, for a frequency range of >1 kHz, although the constructional height, pipe length and area dimension of the line can be kept small. In accordance with a preferred exemplary embodiment, the pipeline 1 has in substance circular holes 2, penetrating through the pipeline, having a diameter of about 0.45 mm. In accordance with the invention, the holes need not have exclusively circular diameters, but rather there are suitable almost any arbitrary geometric shapes, such as for example slits. The free hole surface should however, independent of the geometric configuration, have a share of a maximum of 10 per cent of the overall surface.

Figure 2:
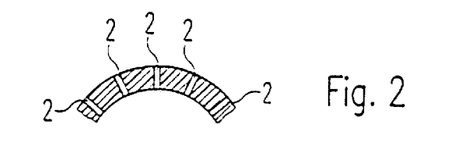
FIG. 2 a cross-sectional view of a part of the wall of the gas flow-though line of FIG. 1.

In FIG. 2 it is shown how microperforations 2 having in substance uniform diameter penetrate through the wall 4 of the pipeline 1.

Figure 3:
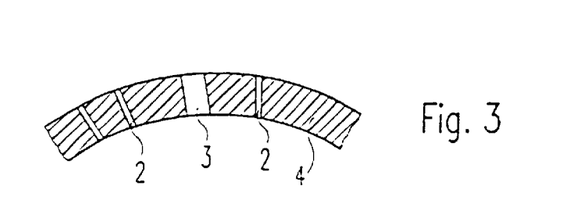
FIG. 3 a view similar to that of FIG. 2, in accordance with a further exemplary embodiment.

As can be seen in FIG. 3, along with the microperforations 2, there may be also be provided at least one larger hole 3. These larger holes 3 have preferably a diameter of substantially more than that of the microperforations 2, but less than 5 mm. The combination of the microperforations 2 with the larger holes 3, the diameter of which is less than that with the known Helmholz absorbers, can lead to a significant broadening of the dampable frequency band towards lower frequencies as far as about 500 Hz.

In the literature it is often explained that finely perforated absorbers must be provided in a plate shape and must be placed at a spacing before a rigid back wall. Further, there is frequently expressed the view that fine or microperforations would very quickly be blocked and that the sound absorber would thereby be made ineffective. However, as will be illustrated later with reference to FIGS. 4 and 5, it was determined with the present invention that the absorption effect with a line in accordance with the invention is relatively independent of the percentage of holes which are blocked, whereby naturally not all holes may be closed.

This is due to the fact that the sound absorbing effect in accordance would the invention is due to turbulent flows which arise in the region of the holes 2. By means of holes of less than 1 mm it can be attained that in the holes so much viscous friction is to be overcome that no additive absorption is then necessary. The turbulent flows in the region of the holes 2 and 4 thus absorb the sound energy.

The present invention finds employment in particular in the field of vehicles, as already explained above, since the invention does not need any large areal extents and at the same time is of abrasion resistant materials, so that with air-carrying lines there is no danger for following motors or machines due to the release of particles.

As material for the line in accordance with the invention there are suitable on the one hand polymer plastics, such as for example PMMA, rubber or rubber-like materials or on the other hand natural products. As materials there are suitable all materials or fabrics, whether they are transparent or not, which have abrasion resistant surfaces, so that no release of particles can occur.

With the connection of the gas flow-though line 1 in accordance with the invention upstream of a turbocharger, its extremely annoying high frequency charger whistling sound can be reduced. Advantageously, there occurs in accordance with the invention no change of the inner cross-section of the line, whereby the quantity of air drawn in is not altered. Further, the length of the air suction hose, determined by structural factors, is not altered.

Along with the employment in the engine compartment of a vehicle, the present invention is suitable for employment in contour-following, areal configuration also for door panelling and so-called roof absorbers in motor vehicle interior spaces (passenger compartments) and for employment as motor hood absorbers. Of advantage thereby is that the device in accordance with the invention can be provided selectively in either a transparent or non-transparent manner, which for example together with mixture of circular and slit-shaped holes, as desired, leaves open many possibilities with regard to design.

The holes may be produced either mechanically, for example by means of stamping, and/or by means of the use of laser beams.

The effect of a gas flow-through line, in accordance the invention, will now be explained with regard to its sound absorption with reference to FIGS. 4 and 5.

Figure 4:
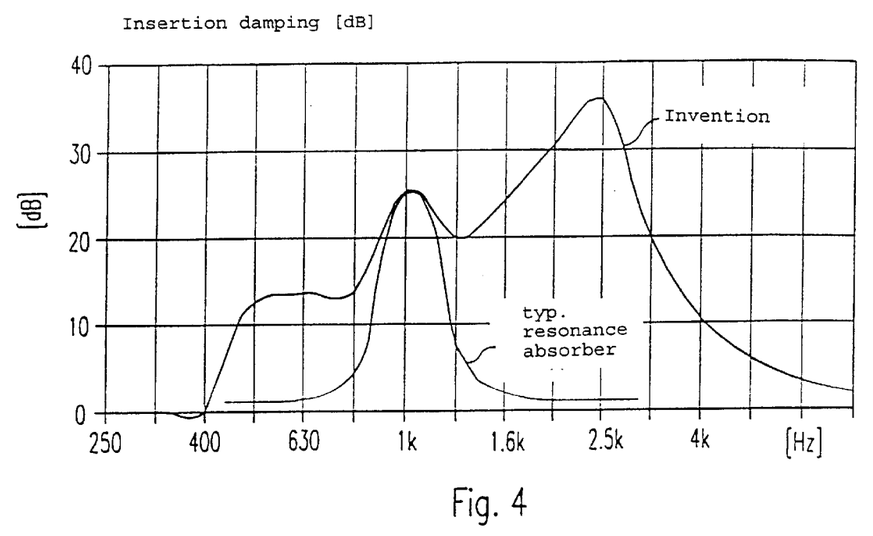
FIG. 4 graphically, the degree of insertion damping (insertion damping) of a gas flow-through line in accordance with the invention, in comparison with a typical resonance absorber.

In FIG. 4 there is illustrated the so-called insertion damping in decibels (dB), in dependence upon the frequency of the sound, on the one hand for a device in accordance with the invention and on the other hand for a known resonance absorber. There is to be understood by insertion damping the difference between the louder and the quieter opening of a pipeline. In the example illustrated in FIG. 4, it can be seen that the damping effect of a gas flow-through line in accordance with the invention is substantially more broad band than the typical resonance curve of a resonance absorber such as for example of the Helmholz type. As can be seen in FIG. 4, in accordance with the invention an insertion damping of more than 10 decibels can be obtained in the region from about 500 Hz to about 4 kHz. In comparison with resonance absorbers the sound absorbing line in accordance with the invention is thus substantially more broad band in its effect.

Figure 5:
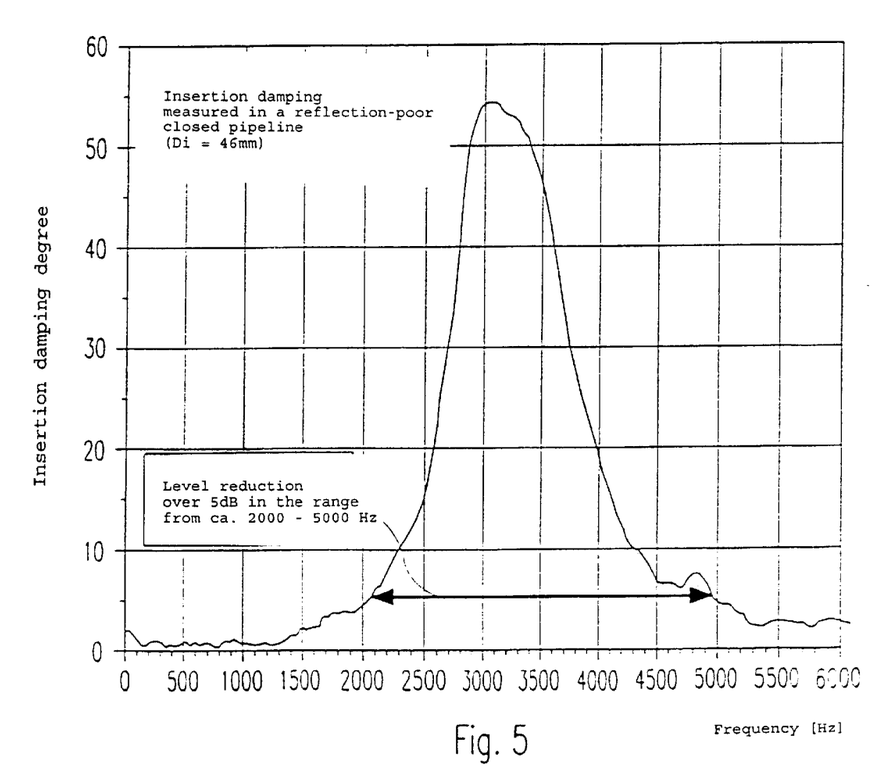
FIG. 5 a further graphic, which illustrates the so-called insertion damping of a pipeline in accordance with the present invention, in dependence upon the frequency to be damped.

FIG. 5 shows measurement results of the insertion damping, such as they are obtained at a reflection-poor closed pipeline with an internal diameter of 46 mm in accordance with the invention. As can be seen from FIG. 5, there is present a level reduction of the insertion damping of more than 5 decibels in a range from about 2,000 to 5,000 Hz.

A matching of the frequencies to be absorbed can be obtained for example by means of changing the diameter of the microperforations, whereby enlarged holes displace the absorption effect towards lower frequencies.

Figure 6A:
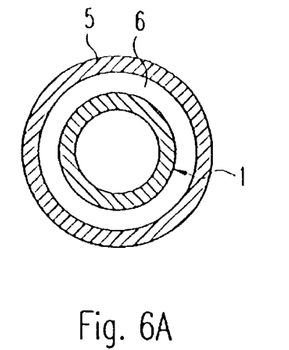
Figure 6B:
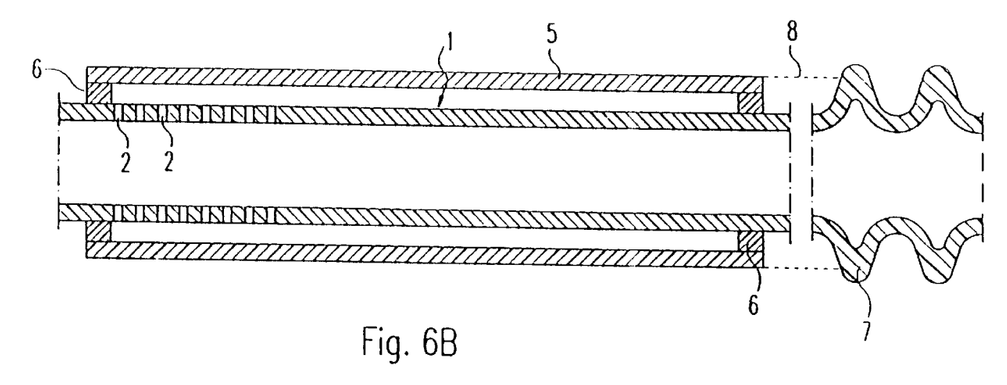
Figure 7A:
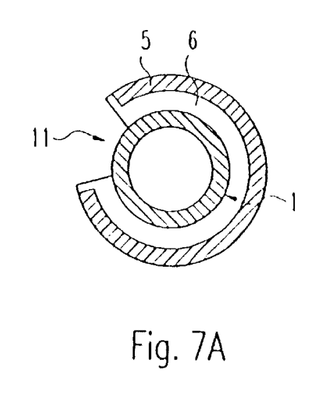
Figure 7B:
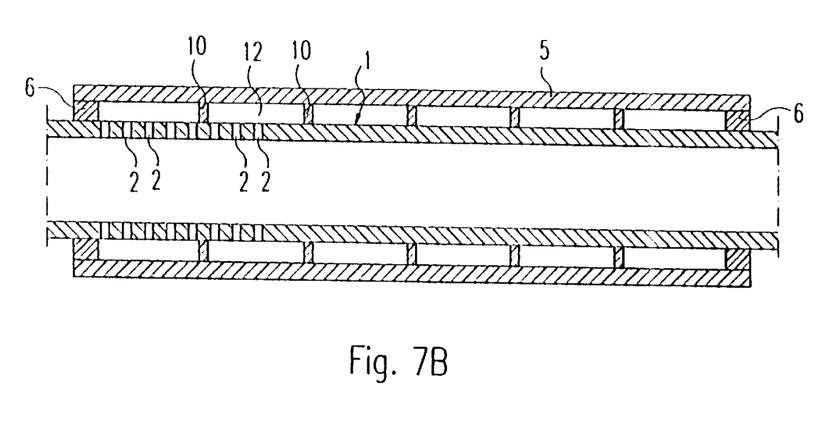

FIGS. 6(A,B) show a hose or pipe-shaped configuration of a line 1 having microperforations 2 over at least one length section. The line 1, for example the suction hose in accordance with FIG. 1, is surrounded in sections by a sheathing 5, which is supported on the line 1 by way of supports 6. As already indicated in FIG. 1, the suction hose 1 there has at least at one end a bellows section 7, and mounting flanges 9. FIGS. 6(A,B), in particular FIG. 6B, shows that the outer dimension of the sheathing 5 in its external contour, which is illustrated by means of a broken line 8, does not project beyond the outer dimensions of the bellows section 7, so that overall no greater requirement for space is needed. FIGS. 7(A,B) shows, with regard to FIGS. 6(A,B), a configuration with which the space formed within the sheathing 5 is subdivided in a coffer-like manner with the aid of coffered dividing walls 10.

FIGS. 7(A,B), there FIG. 7A, further shows that the sheathing 5 need not extend completely over the entire circumference of a hose or pipe-like line, but may also have a sheathing-free zones 11 in the longitudinal direction. FIG. 7B shows that the microperforations need not necessarily open out into one or all of the coffer-like sections 12.

Figure 8A:
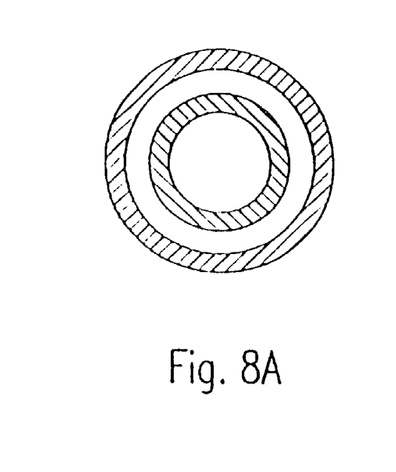
Figure 8B:
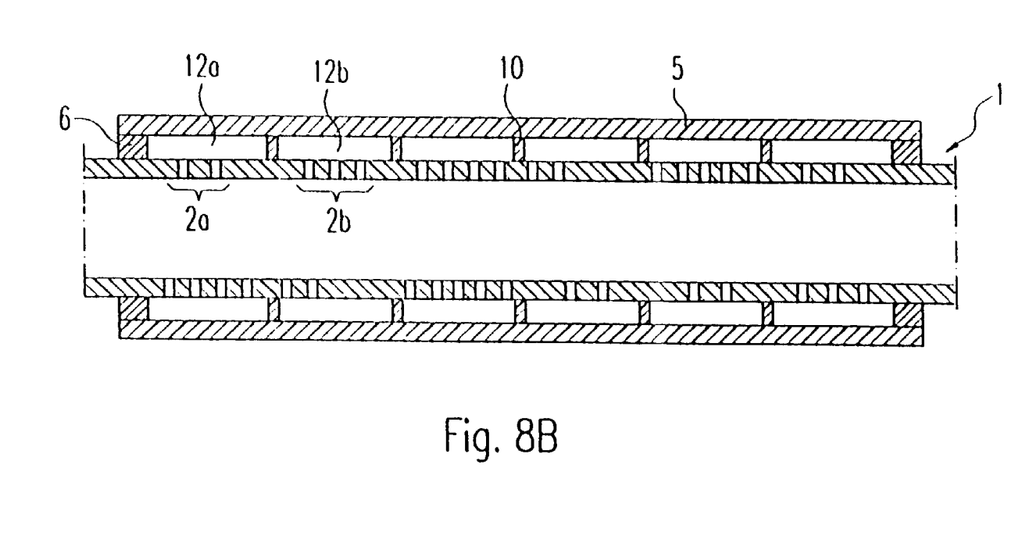

FIGS. 8(A,B) show schematically a further development of the configuration according to FIGS. 7, with which in the individual coffer-like sections 12a, 12b, . . . in each case very different numbers of microperforations 2a, 2b, . . . open out, so that over the longitudinal extent of the line 1 very different hole area quantities are provided.

With the aid of the sheathings 5, of which with one line of course a plurality may be provided, the formation of coffer-like sections 12 by means of the dividing walls 10, and of the different hole area dimensions explained with reference to FIGS. 8(A,B), and the proportion of hole surface to the entire surface, the line through which the gas flows can be optimally tuned in its airborne sound absorption behaviour to the respective acoustic problem concerned.

In the application to a charger pipe, which has two bellows sections 7 and a pipe piece 1 arranged therebetween, the pipe length of the charger pipe is unaltered and also the internal diameter is unaltered, whereby also the quantity of the air drawn in is unaltered. By means of the sheathing, constituted in its outer dimensions as explained above, which do not go beyond the bellows diameter, no further need for space is involved.

However, it is attained that the microperforations 2 cannot be blocked from the outside. By means of the material explained above, the holes advantageously also cannot be blocked from the inside. Even if, as explained above, the absorption effect with a line 1 in accordance with the invention is a relatively independent of the percentage of blocked microperforations 2, the sheathing 5 represents in any event an improvement in this regard.

Figure 9:
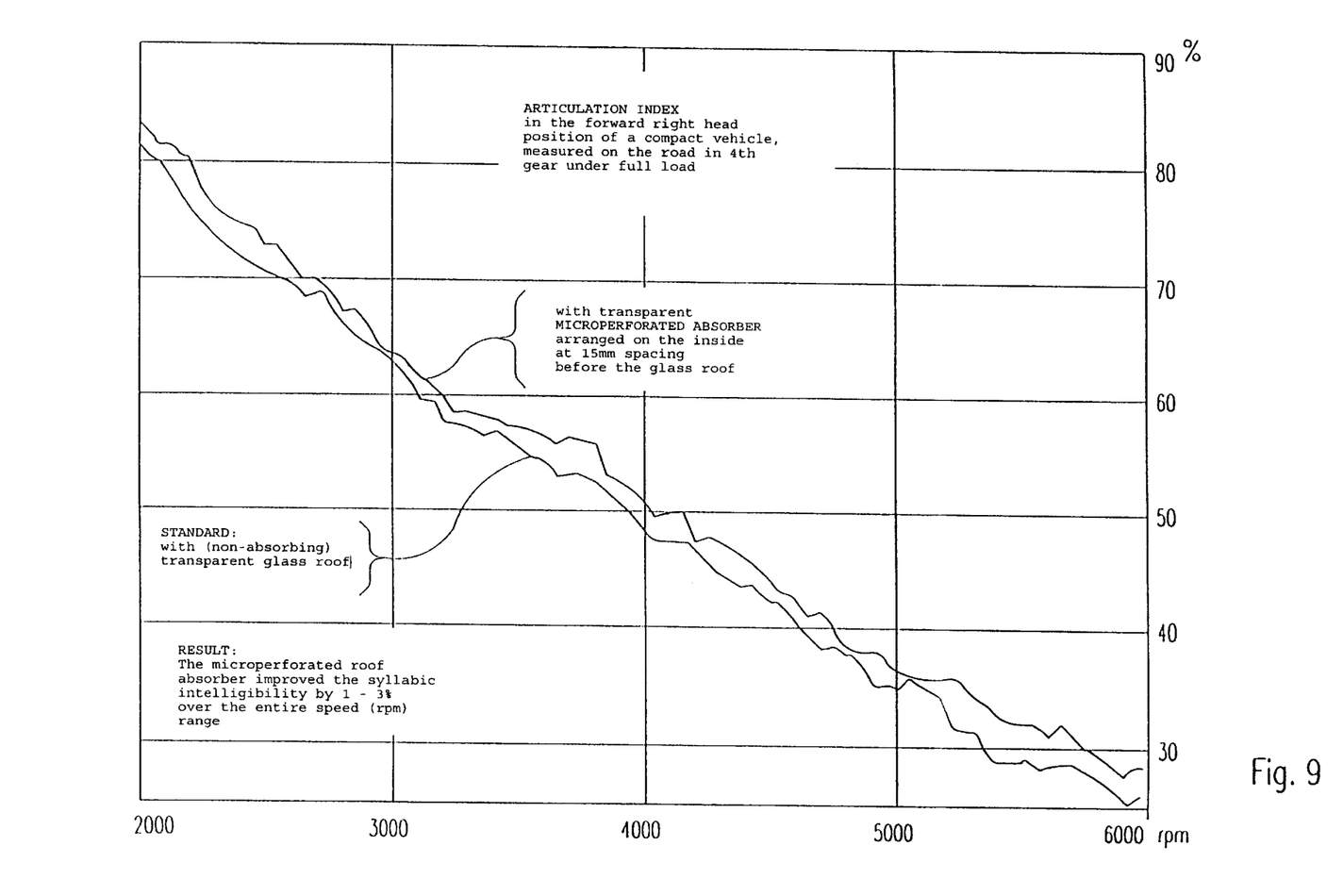

It was explained above that the term gas flow-through line 1 is to be broadly interpreted, and that with such a gas flow-though line 1 the microperforations 2 may also only be provided at certain locations. An example of such a further application is a passenger compartment of a vehicle having a translucent glass sun roof. Microperforations in such a glass sun roof, with or without a contour-following sheathing—that is an external surface having no perforations—make it possible in the case of this application significantly to improve speech understanding. FIG. 9 shows measurement results with such an application. FIG. 9 shows the articulation index AI in dependence upon the motor revolutions, with a transparent glass roof, in one case without and in one case with the configuration in accordance with the invention, namely with microperforated absorber and a sheathing, spaced therefrom, in the form of a hole-free or perforation-free glass sun roof. The articulation index AI, frequently called also the syllabic intelligibility, describes the noise comfort by means of a comparison of a so-called speech surface, which is defined according to frequency and dynamics, in relation to a measured motor spectrum. Lower values of the articulation index mean that an understanding of speech in the measured vehicle is poorly possible, while higher values mean that the motor noise does not significantly disturb the understanding of speech. The illustration in accordance with FIG. 9 shows the significant improvement.

Similar results are attained when a disrupting sound source was altered in its sound absorbing behaviour in accordance with the invention, for example the charger pipe of a motor, whereby here attention can be directed to the explanation of the graphical illustrations in accordance with FIG. 4 and FIG. 5.

Figure 10:
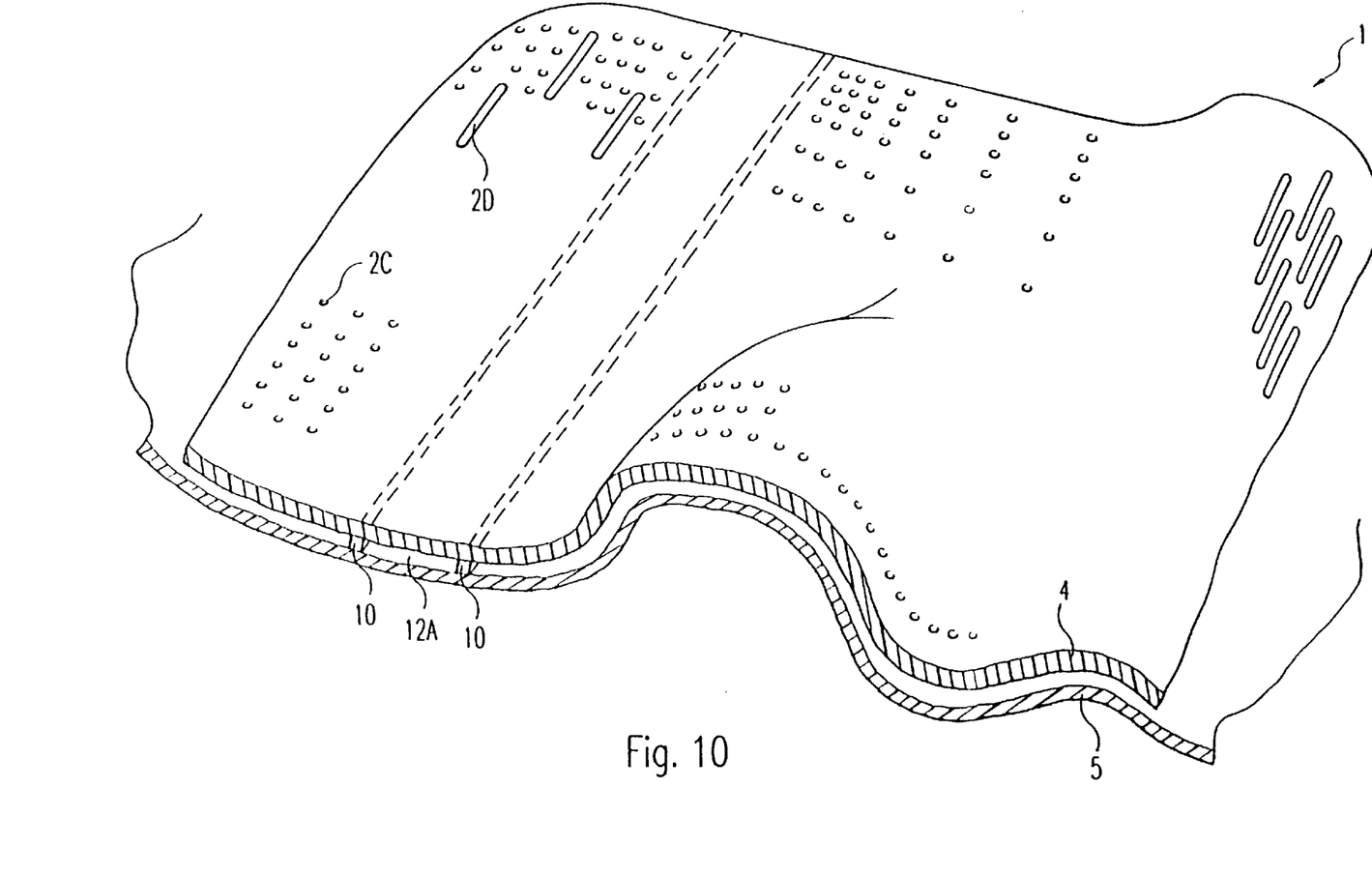

The above explanations show that the invention can be employed not only with hose or pipe-like lines carrying a gas flow, but also with arrangements of arbitrary contours. FIG. 10 shows, as an example, schematically, that the wall 4 of a pipeline, in the sense of the present invention, may have an arbitrary contour development. FIG. 10 also shows that the microperforations 2 may have arbitrary contour development, for example in the form of circular microbores 2C or slits 2D, whereby a mixture or a section-wise accumulation of particular kinds of these microperforations 2 may be provided.

FIG. 10 further shows that the sheathing may be contour-following with supports or coffer-forming dividing walls 10, whereby it is shown that indeed particular coffer-like sections, for example the coffer-like section 12A, need not have microperforations in the associated section of the wall 4.

This shows that the configuration in accordance with the invention can be employed not only for sound absorption, but beyond that also—without adverse influence on acoustical effects—as a design element, for example in the passenger compartment of a vehicle.

Figure 11:
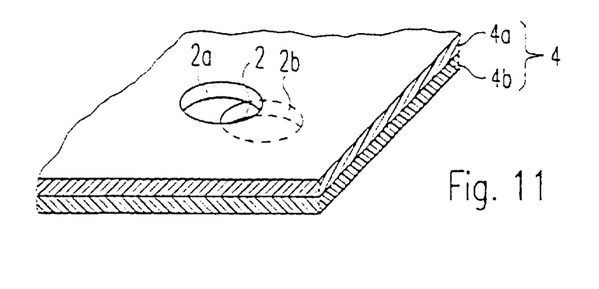

With reference to FIG. 11 there will be explained a further configuration, how a microperforation 2 may be formed in a wall 4. The wall 4 consists of an least two wall layer parts 4a, 4b, layered upon one another, having the perforations 2a and 2b. By means of suitable adjustment of the positioning of the wall layer parts 4a, 4b with respect to one another there is possible a microperforation of an extraordinary small penetration surface, even if the openings 2a and 2b in the wall layer parts 4a, 4b themselves have significantly larger opening surfaces.

By adjustment of the two wall layer parts 4a, 4b with respect to one another, the opening surface of the microperforations 2 is settable. The perforations 2a, 2b may thereby be manufactured in an economic manner, for example by means of stamping. In the case of circular perforations, the microperforation 2 has an approximately elliptical or lens-shaped cross-section. By means of arbitrary combination of different geometric configurations of the perforations, such as circular openings and slits, with respect to one another, there are provided acoustically effective openings in virtually any desired configuration.

It thus shows itself that a setting of the sound absorption behaviour is possible in this manner, with a pipe-shaped pipeline 1, for example by means of rotation of two arranged within one another and/or longitudinal displacement along the pipe axis.

In accordance with the present invention there is thus provided a gas flow-through line having a sound absorption effect, which due to its need for space—which is not increased in comparison with a conventional line—can find employment for example as air suction hose of an internal combustion engine. The application is, however, not restricted to vehicles; the invention can rather find application anywhere where carried gas flows are to be sound-damped.

What is claimed is:

1. A gas flow-through line with sound absorption effect comprising a wall having through-going microperforations, said microperforations having a diameter of less than 2 mm, the wall further having second holes, the free diameter of which is substantially greater than that of the microperforations but smaller than about 5 mm.

2. The line according to claim 1 comprising a substantially contour-following sheathing of the line provided, at least in sections, in the region of the microperforations.

3. The line according to claim 2 wherein the sheathing is divided into coffer-like sections.

4. The line according to claim 3 comprising different hole surface dimensions over at least the longitudinal extent of a sheathed region of the line.

5. The line according to claim 1, wherein said line is a pipeline having a substantially circular cross-section.

6. The line according to claim 1, wherein the wall of the line has a surface and the microperforations have a free hole surface that takes up a maximum of 10% of the overall surface of the wall.

7. The line according to claim 1, wherein the microperforations are approximately circular and have a diameter of about 0.45 mm.

8. The line according to claim 1 wherein the microperforations have arbitrary geometries.

9. The line according to claim 1 being formed of a material selected from the group consisting of polymer plastics, rubber or rubber-like materials, and natural products.

10. The line according to claim 9, comprising abrasion resistant materials.

11. The line according to claim 1 comprising an air suction hose of an internal combustion engine.

12. The line according to claim 1 comprising an air suction hose of a turbocharger of an internal combustion engine.

13. The line according to claim 1 formed for sound absorption of frequencies of more than 1,000 Hz.

14. The line according to claim 1 formed, by means of the second holes, for sound absorption of frequencies of more than 500 Hz.

15. The line according to claim 1 wherein the through-going microperforations are provided in areal regions of the wall of the line.

16. A method of manufacturing the line according to claim 1 comprising the step of manufacturing the microperforations by means of at least one of stamping and working with a laser beam.

17. The method according to claim 16 comprising the step of producing the microperforations by forming the wall of the line of at least two wall layer parts, displaceable with respect to one another, whereby each wall layer part has perforations, and effecting the opening surface of the microperforations by mutually displacing the wall layer parts such that the respective perforations align only partially with one another.

18. The line according to claim 1 wherein said microperforations have a diameter of 1 mm or more.

19. The line according to claim 1 wherein said microperforations have a diameter less than 1 mm.

20. The line according to claim 1 wherein said microperforations are slit-shaped.

21. A gas flow-through line with sound absorption effect comprising a wall having through-going microperforations, said microperforations having a diameter of less than 2 mm, the line further comprising a contour-following sheathing, at least in sections, in the region of the microperforations, the line further comprising bellows sections wherein the spacing of the sheathing from the line does not exceed the maximum bellows dimension.

22. The line according to claim 21 wherein the spacing of the sheathes from the line is approximately equal to the maximum bellows dimension.

23. A gas flow-through line with sound absorption effect comprising a wall having through-going microperforations, said microperforations having a diameter of less than 2 mm, wherein the wall further comprises at least two perforated wall layer parts, displaceable with respect to one another, so that by means of displacement of the wall layer parts with respect to one another, the opening surface of the overall perforation can be set.

24. The line according to claim 23 comprising a bending resistant material selected from the group consisting of polymer plastics, rubber or rubber-like materials, and natural products.

25. The line according to claim 24 wherein the bending resistant material is abrasion resistant.

* * * * *